US009779569B2

(12) United States Patent
Yun

(10) Patent No.: US 9,779,569 B2
(45) Date of Patent: Oct. 3, 2017

(54) METHOD FOR CONTROLLING DOOR LOCK OF HOME NETWORK SYSTEM

(71) Applicant: Yong Joon Jeon, Seoul (KR)

(72) Inventor: Jeong Ku Yun, Seoul (KR)

(73) Assignee: Yong Joon Jeon, Seoul (KR)

( * ) Notice: Subject to any disclaimer, the term of this patent is extended or adjusted under 35 U.S.C. 154(b) by 0 days.

(21) Appl. No.: 15/153,749

(22) Filed: May 13, 2016

(65) Prior Publication Data

US 2017/0084101 A1 Mar. 23, 2017

(30) Foreign Application Priority Data

Sep. 22, 2015 (KR) ........................ 10-2015-0133971

(51) Int. Cl.
*B60R 25/00* (2013.01)
*G07C 9/00* (2006.01)

(52) U.S. Cl.
CPC ..... *G07C 9/00309* (2013.01); *G07C 9/00174* (2013.01); *G07C 9/00571* (2013.01); *G07C 2009/00769* (2013.01); *G07C 2209/08* (2013.01)

(58) Field of Classification Search
None
See application file for complete search history.

(56) References Cited

U.S. PATENT DOCUMENTS 4,463,349 A * 7/1984 Mochida .............. G07C 9/0069 340/11.1
2010/0283579 A1* 11/2010 Kraus ................ G07C 9/00944 340/5.7
2011/0291798 A1* 12/2011 Schibuk ................. G07B 15/00 340/5.61

FOREIGN PATENT DOCUMENTS

JP 4612602 B2 1/2011
KR 10-2006-0124897 A 12/2006
KR 10-2007-0080652 A 8/2007
KR 10-1267342 B1 5/2013
KR 10-2014-0002578 A 1/2014

OTHER PUBLICATIONS

Web page retrieved from http://terms.naver.com/entry.nhn?docId=20637488&cid=50305&categoryId=50305.

* cited by examiner

*Primary Examiner* — Adolf Dsouza
(74) *Attorney, Agent, or Firm* — Revolution IP, PLLC

(57) ABSTRACT

Provided is a method for controlling a door lock of a home network system, the method including: generating release information used for locking or unlocking the door lock in an external software module which communicates with a first smart terminal of a user according to a request from the first smart terminal, or in a software installed in the first smart terminal; transmitting the generated release information to the gateway and a second smart terminal of a temporary user; transmitting the received release information to a controller of the door lock; and locking/unlocking the door lock by determining whether release information input by the temporary user are identical to the release information transmitted from the gateway.

14 Claims, 7 Drawing Sheets

METHOD FOR CONTROLLING DOOR LOCK OF HOME NETWORK SYSTEM

CROSS-REFERENCE TO RELATED PATENT APPLICATION

This application claims the benefit of Korean Patent Application No. 10-2015-0133971, filed on Sep. 22, 2015, in the Korean Intellectual Property Office, the disclosure of which is incorporated herein in its entirety by reference.

BACKGROUND

The present invention relates to a method for controlling a door lock of a home network system, and more particularly, to a method for controlling a door lock of a home network system, whereby release information that can be used for unlocking or locking a door lock within a limited period of time by a temporary user who enters a house or an office is generated and controlled.

In general, a digital door lock is installed in a house or an office to allow locking/unlocking of a door in response to digital signals that are selectively generated by a inside person of the house or office after identifying an outside visitor.

Alternatively, such a digital door lock is locked/unlocked by password, fingerprint verification, or contact or proximity of an electronic key, such as a radio frequency identification (RFID) card, a bus card, etc, which are inputted from the outside. By the way, the conventional digital door lock is independently operated without interrelation with a wireless communication system, such as a home network, and locking of the conventional digital door lock is released by its own independent processing. That is, in the conventional digital door lock, when a user inputs a password using a button input unit provided in the digital door lock or lets an electronic key, such as a radio frequency (RF) card, etc., to be close to the digital door lock, a controller provided in the digital door lock determines whether the input password is identical to a password stored in the digital door lock, or whether an identification (ID) of the electronic key is one of IDs that have been already stored in the digital door lock, and thus the door is opened/closed based on the determination.

In the conventional digital door lock, a code for authorizing locking/unlocking, for example, a password or an ID of the electronic key is stored in a memory provided in the digital door lock. Thus, the code has to be notified in advance to a temporary user who visits a house or an office temporarily for a limited time, as well as any new person who the original user authorizes to use the house or office, such that the password could be revealed to an unauthorized user and there is an inconvenience that the user has to change the password periodically.

SUMMARY

The present invention provides a method for controlling a door lock of a home network system, whereby release information that can be used for locking/unlocking the door lock by a temporary user who enters a house or an office for a limited time is generated and controlled.

According to an aspect of the present invention, there is provided a method for controlling a door lock of a home network system in which the door lock for locking/unlocking a door is connected to a gateway and is connected to a communication network, the method including: generating release information used to lock or unlock the door lock in an external software module which communicates with a first smart terminal of a user according to a request from the first smart terminal, or in a software installed in the first smart terminal; transmitting the generated release information to the gateway and a second smart terminal of a temporary user; transmitting the received release information to a controller of the door lock; and locking/unlocking the door lock by determining whether release information input by the temporary user are identical to the release information transmitted from the gateway.

According to another aspect of the present invention, there is provided a system including a gateway of a home network system, where the gateway is connected to a door lock and the door lock is connected to a communication network via the gateway, the system comprising one or more software and/or hardware modules configured to: receive release information used to lock or unlock the door lock, where the release information is generated in an external software module which communicates with a first smart terminal of a user according to a request from the first smart terminal, or in a software installed in the first smart terminal; transmit the received release information to a second smart terminal of a temporary user, where the release information input by the temporary user is compared with the received release information, and locking/unlocking the door lock is determined based on the result of the comparison.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
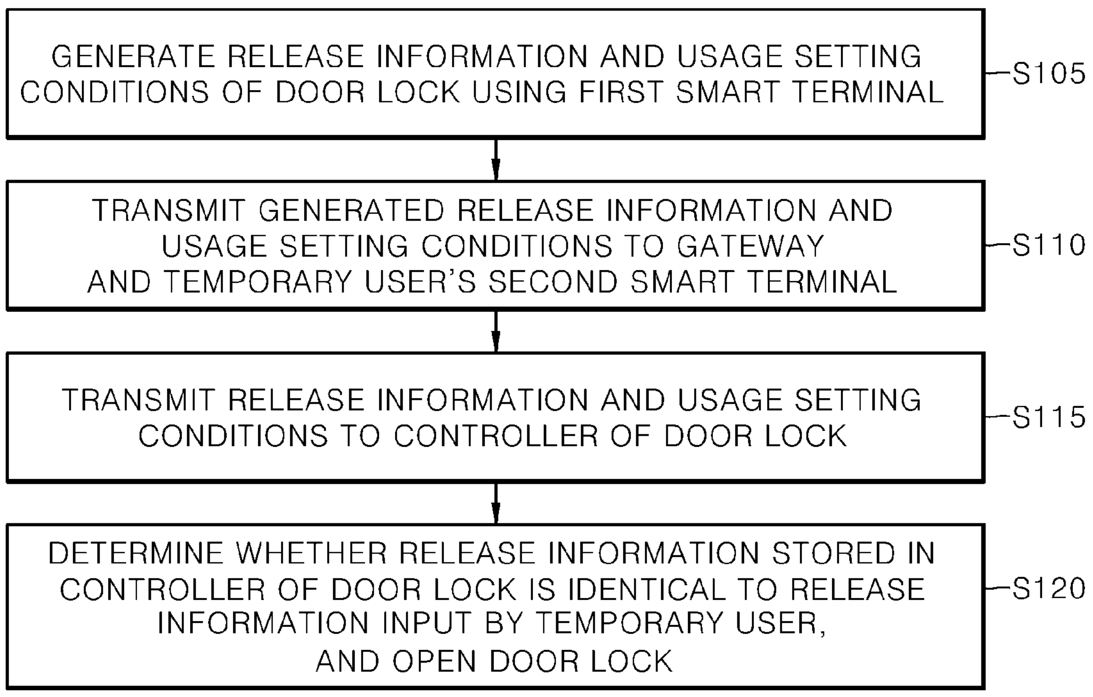
FIG. 1 is a block diagram illustrating a method for controlling a door lock of a home network system according to an embodiment of the present invention.
Figure 2:
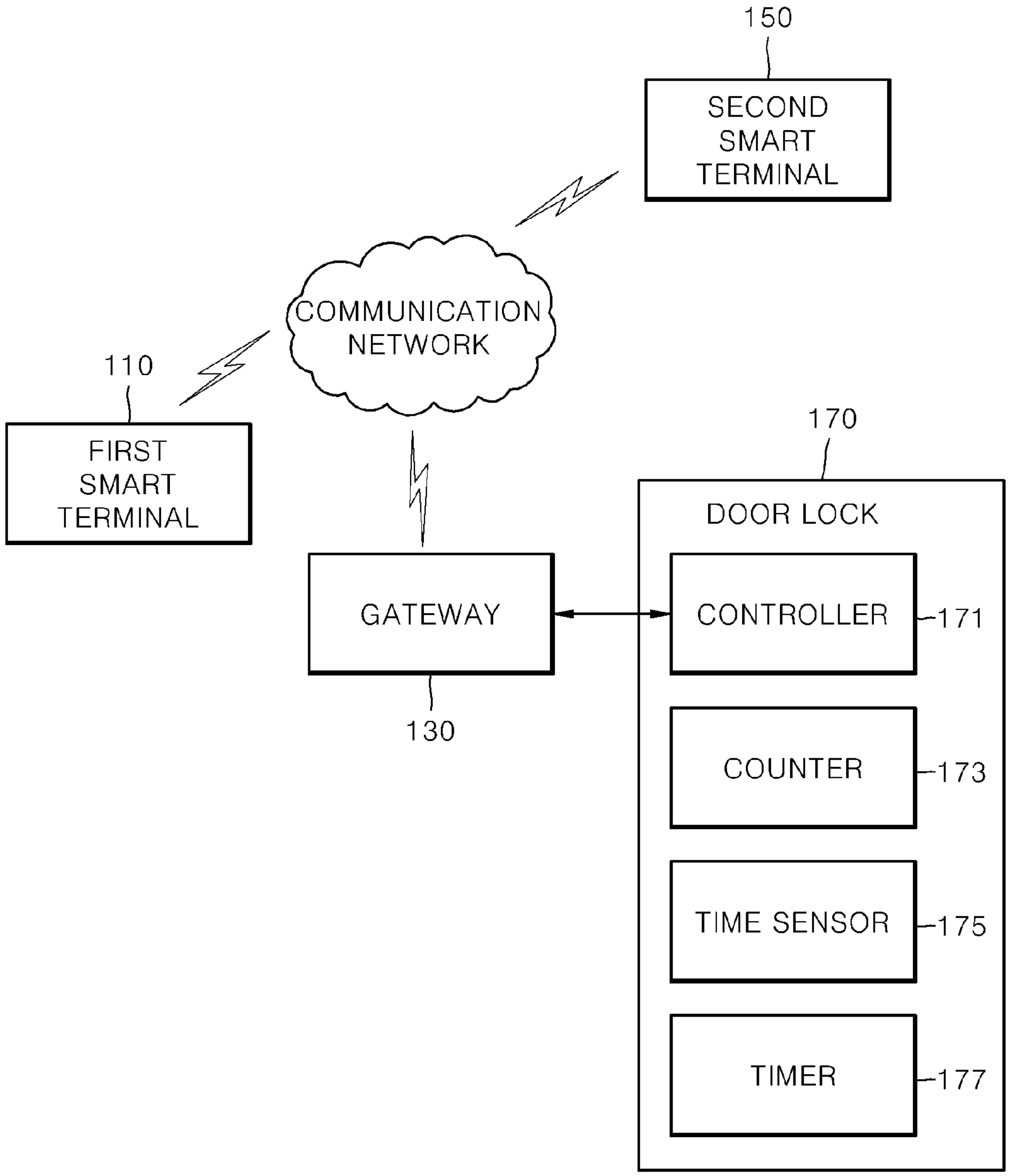
FIG. 2 is a block diagram illustrating a configuration for controlling the door lock of the home network system illustrated in FIG. 1.

FIGS. 1 through 7 illustrate a method for controlling a door lock of a home network system according to embodiments of the present invention. In the present invention, a door lock installed in a house will be described as an example. However, this is limited to the present embodiment and thus may be applied to a door lock installed in a building, an office, etc., as well as the door lock installed in the house.

The present invention includes a first smart terminal 110, a gateway 130, a second smart terminal 150, and a door lock 170 so as to implement the method for controlling a door lock of a home network system.

The first smart terminal 110 that is configured to be manipulated by a user and provides configurations to generate release information and usage setting conditions may include at least one of a smartphone, a smartpad, and a personal computer (PC). When a PC is used as the first smart terminal 110, software (a program) for generating the release information and the usage setting conditions may be installed in the PC.

Even when a smartphone or smartpad is used as the first smart terminal 110, software (an application) for generating the release information and the usage setting conditions may be installed in the smartphone or smartpad. The software may be provided from a company for supplying the door lock 170, a company for supplying the gateway 130, or a company for implementing a home network system. Here, the release information may be a temporary password for unlocking/locking the door lock 170.

The gateway 130 is a device to which the door lock 170 and a wireless communication network are connectable via Z-wave, local area network (LAN), wireless fidelity (Wi-Fi), etc., and a gateway originally installed for a home network may be also used as the gateway 130 by extending its function. The door lock 170 may be connected to the gateway 130 and connected to a communication network. Meanwhile, in the current embodiment, a wireless communication network has been described as a mobile communication network. However, the communication network is not limited to any particular type of communication network.

The gateway 130 is connected to various types of home network devices (not shown) including a refrigerator, a washing machine, gas facility, etc., as well as the door lock 170. Thus, the home network devices (not shown) may be operated by receiving external remote control instructions from the gateway 130. The gateway 130 may transmit an authentication key to the second smart terminal 150 that will be described later, such that the second smart terminal 150 may be connectable to the gateway 130. That is, the temporary user may remotely control the home network device (not shown) using the second smart terminal 150. This will now be described in greater detail.

The second smart terminal 150 is configured to be used by the temporary user and receives the release information and/or the usage setting conditions generated by the user via the communication network. The second smart terminal 150 may include at least one of a smartphone, a smartpad, and a PC, as in the first smart terminal 110. The second smart terminal 150 receives the release information and the usage setting conditions in the form of a short message service (SMS) or a multimedia messaging service (MMS) of the smartphone (mobile phone), an e-mail, a chatting application, etc, from the user via the communication network.

The door lock 170 is connected to the gateway 130 and is connected to the communication network via the gateway 130. The door lock 170 is installed at the user's house entrance door and includes a controller 171, a counter 173, a time sensor 175, and a timer 177. In addition, although not shown, the door lock 170 may further include a locking module (not shown). When the user generates the release information and/or the usage setting conditions, the release information and/or the usage setting conditions may also be transmitted to the door lock 170. That is, the release information and/or the usage setting conditions may be transmitted to the controller 171 provided in the door lock 170 via the gateway 130 and are stored in a memory unit (not shown).

The locking module (not shown) is locked or unlocked by the controller 170 such that the corresponding door is opened/closed. The counter 173, the time sensor 175, and the timer 177 are provided to check the usage setting conditions. This will now be described in greater detail.

The method for controlling the door lock of the home network system will be described as follows. First, in an operation of generating and controlling release information, the user generates release information of the door lock 170 using a home network application (software) installed in the first smart terminal 110 (S105). Here, the user is a resident who lives in a house, for example, and the first smart terminal 110 may be used as the user's smartphone. However, as described above, the first smart terminal 110 is not limited to the smartphone.

In the operation of generating the release information, usage setting conditions for limiting a time period for which the release information is valid are generated. The usage setting conditions include, for example, the valid number of times the release information can be validly used, a starting time at which the release information begins valid, and an ending time at which the release information expires, and an valid period of time for which the release information can be validly used based on the time at which the release information are initially input.

Figure 4:
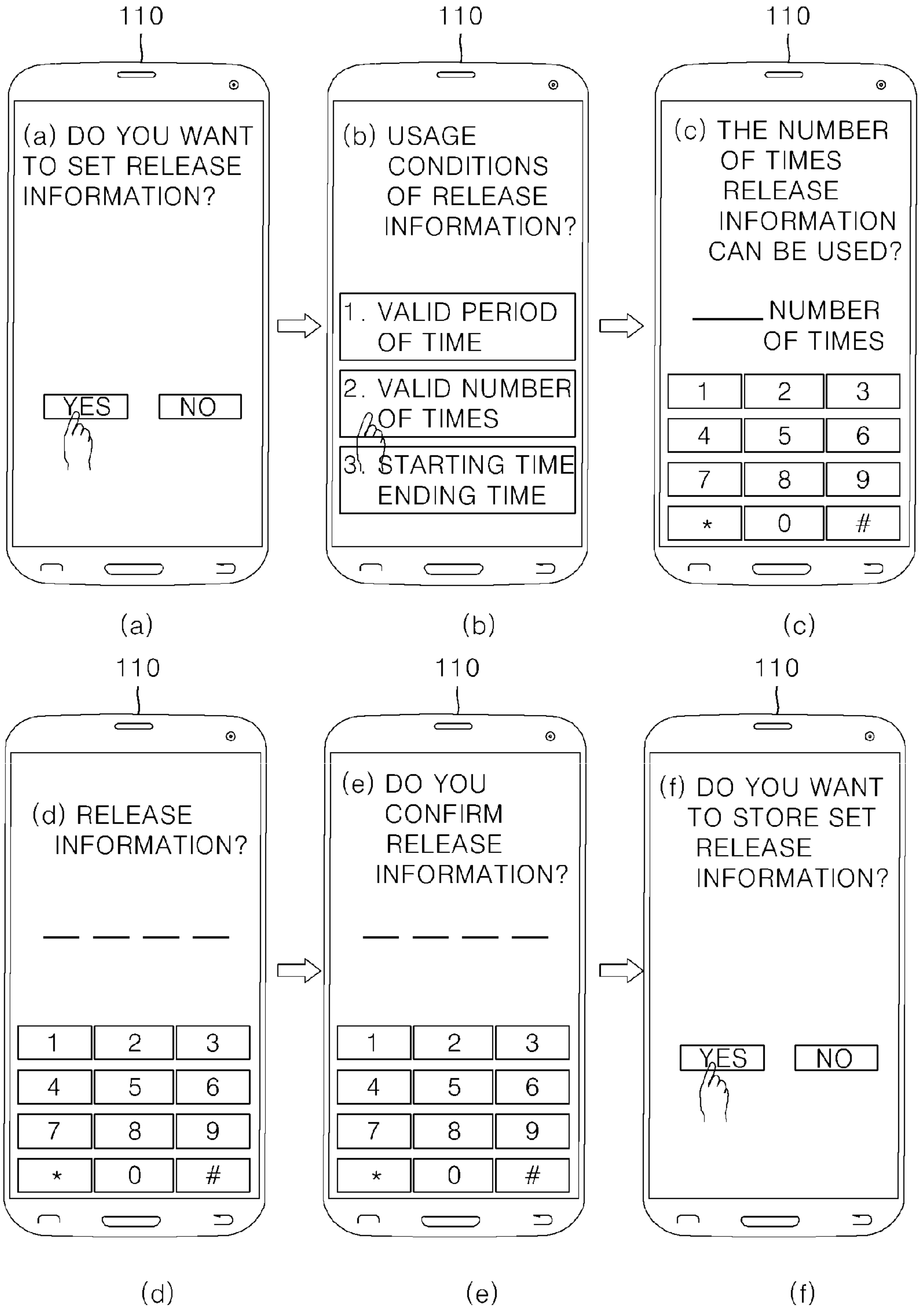
FIGS. 4 through 6 illustrate the detail of an operation of generating release information and setting usage illustrated in FIG. 1.
Figure 5:
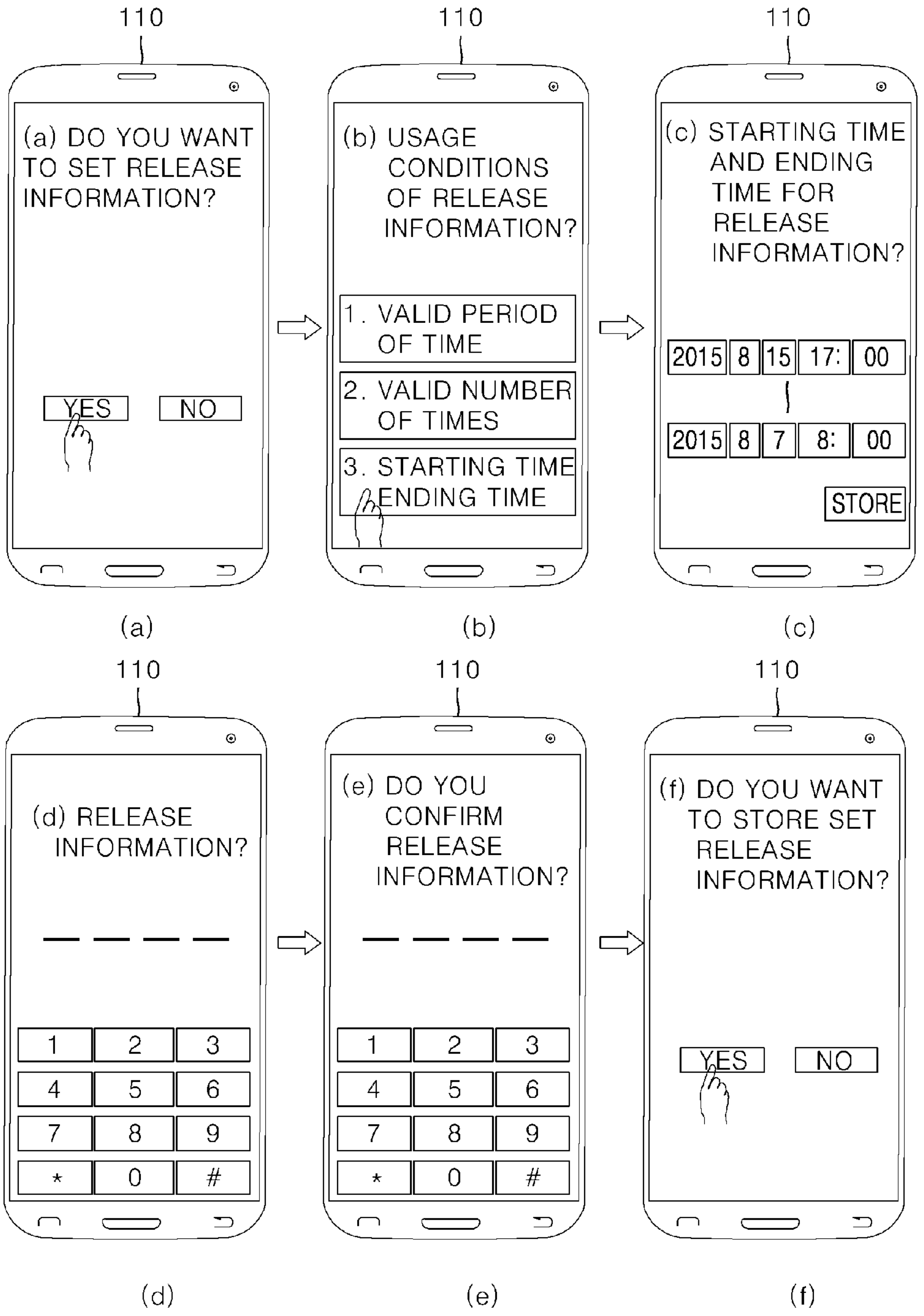
Figure 6:
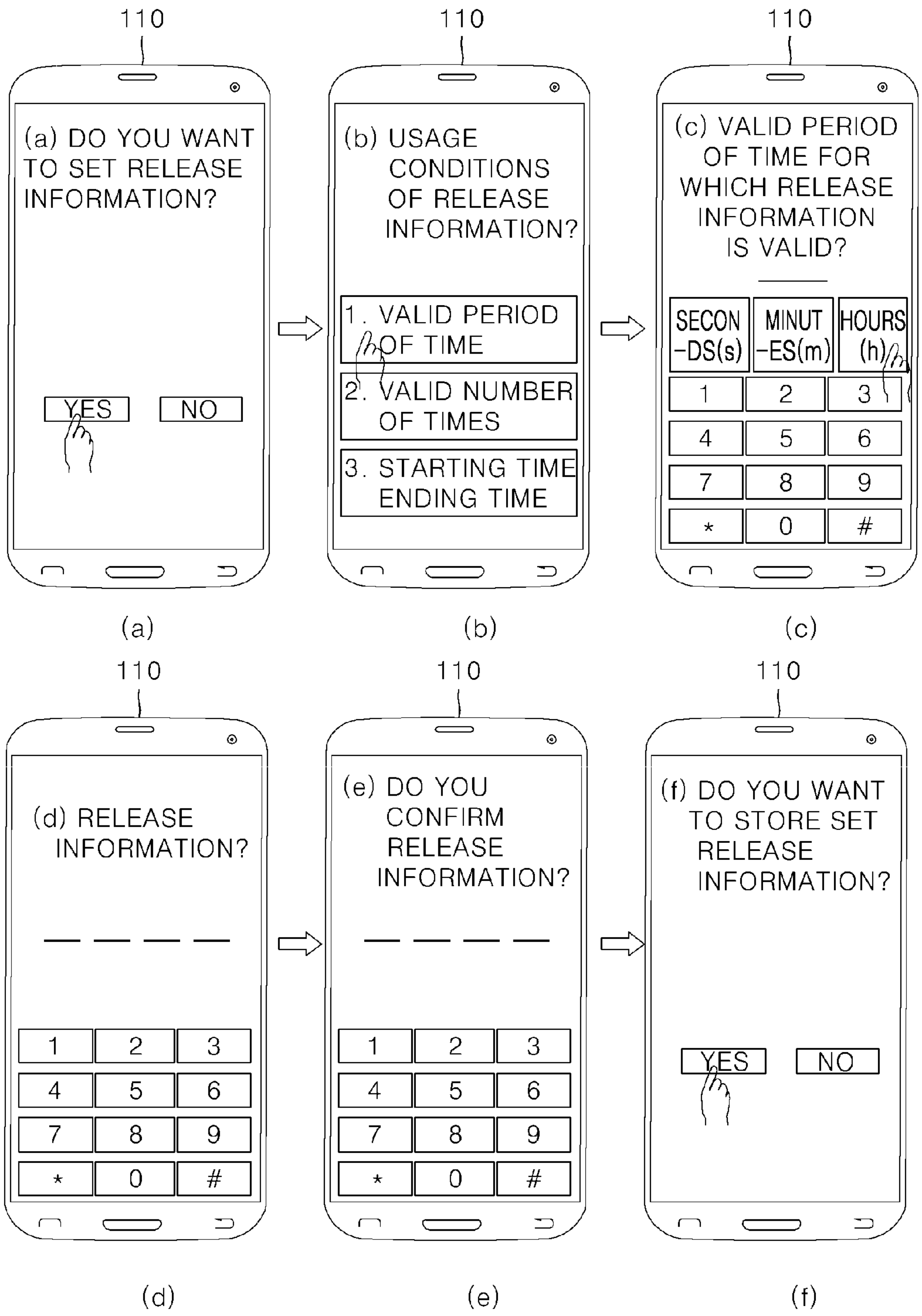

FIGS. 4 through 6 illustrate an operation of generating the release information and/or the usage setting conditions using the smartphone 110, wherein the generating may be performed directly or indirectly by the user. Otherwise, generation of the release information and/or the usage setting conditions may be performed by an application installed in the user's smartphone 110, dependently on or independently from the user. First, referring to FIG. 4, a screen asking whether to set the release information is generated on the user's smartphone 110, as illustrated in (a) of FIG. 4. When the user touches the screen to set the release information, a screen asking which usage setting conditions are set shows up, as illustrated in (b) of FIG. 4.

Referring to FIG. 4, when the valid number of times the release information can be validly used is selected, a screen for setting the number of times is generated, as illustrated in (c) of FIG. 4. After the user sets the number of times the release information can be validly used, screens d and e for setting the release information and confirming the set release information and a screen f for storing the confirmed release information are generated and then terminated.

An operation of generating the release information having different usage setting conditions will now be described with reference to FIG. 5. As illustrated in (a) of FIG. 5, a screen asking whether to set the release information is generated in the user's smartphone 110. When the user touches the screen to set the release information, a screen asking which usage setting conditions are set shows up, as illustrated in (b) of FIG. 5.

Referring to FIG. 5, when the starting time at which the release information begins valid and the ending time at which the release information expires, are selected, a screen for setting the starting time and the ending time is generated, as illustrated in (c) of FIG. 5. After the user sets and stores the starting time and the ending time of the release information, screens d and e for setting the release information and confirming the set release information and a screen f for storing the confirmed release information are generated and then terminated.

An operation of generating the release information having different usage setting conditions will now be described with reference to FIG. 6. As illustrated in (a) of FIG. 6, a screen asking whether to set the release information is generated in the user's smartphone 110. When the user touches the screen to set the release information, a screen asking which usage setting conditions are set shows up, as illustrated in (b) of FIG. 6.

Referring to FIG. 6, when an valid period of time at which the release information valid since the release information has been initially input, is selected, a screen for setting the valid period of time is generated, as illustrated (c) of FIG. 6. In this case, the valid period of time may be set in units of seconds (s), minutes (m), or hours (h), as illustrated in the drawings. After the user sets and stores the valid period of time for the release information, screens d and e for setting the release information and confirming the set release information and a screen f for storing the confirmed release information are generated and then terminated.

FIGS. 4 through 6 illustrate user interfaces in which the user personally inputs and generates the release information (a temporary password) using the first smart terminal 110. However, if the release information is the temporary password including only numbers, as described above, arbitrary release information may also be generated and suggested to the user. The arbitrary release information can be generated by a random-number generation software (application) installed in the first smart terminal 110 without the user's manual input and generation process. On the other hand, when the release information is an electronic key that operates by a communication protocol working in a near distance, such as, Near Field Communication (NFC), the user may not need to generate the release information manually, as illustrated in FIGS. 4 through 6, such that the arbitrary release information may be generated in the software (application) installed in the first smart terminal 110.

When the release information and/or the usage setting conditions are generated through the above operations, the user transmits the release information and/or the usage setting conditions to the gateway 130 and the user's second smart terminal 150 (S110). In this case, transmission of the release information and/or the usage setting conditions is performed via the wireless communications network.

The temporary user may be a person who is not a resident of the house but who visits a house for a limited time or periodically. A smartphone may be used as the temporary user's second smart terminal 150, as the first smart terminal 110. In the current embodiment, the user generates the release information of the door lock 170 using the application that is relevant to the home network system and installed in the first smart terminal 110. However, in the present invention, the application can be any kind of software.

Figure 3:
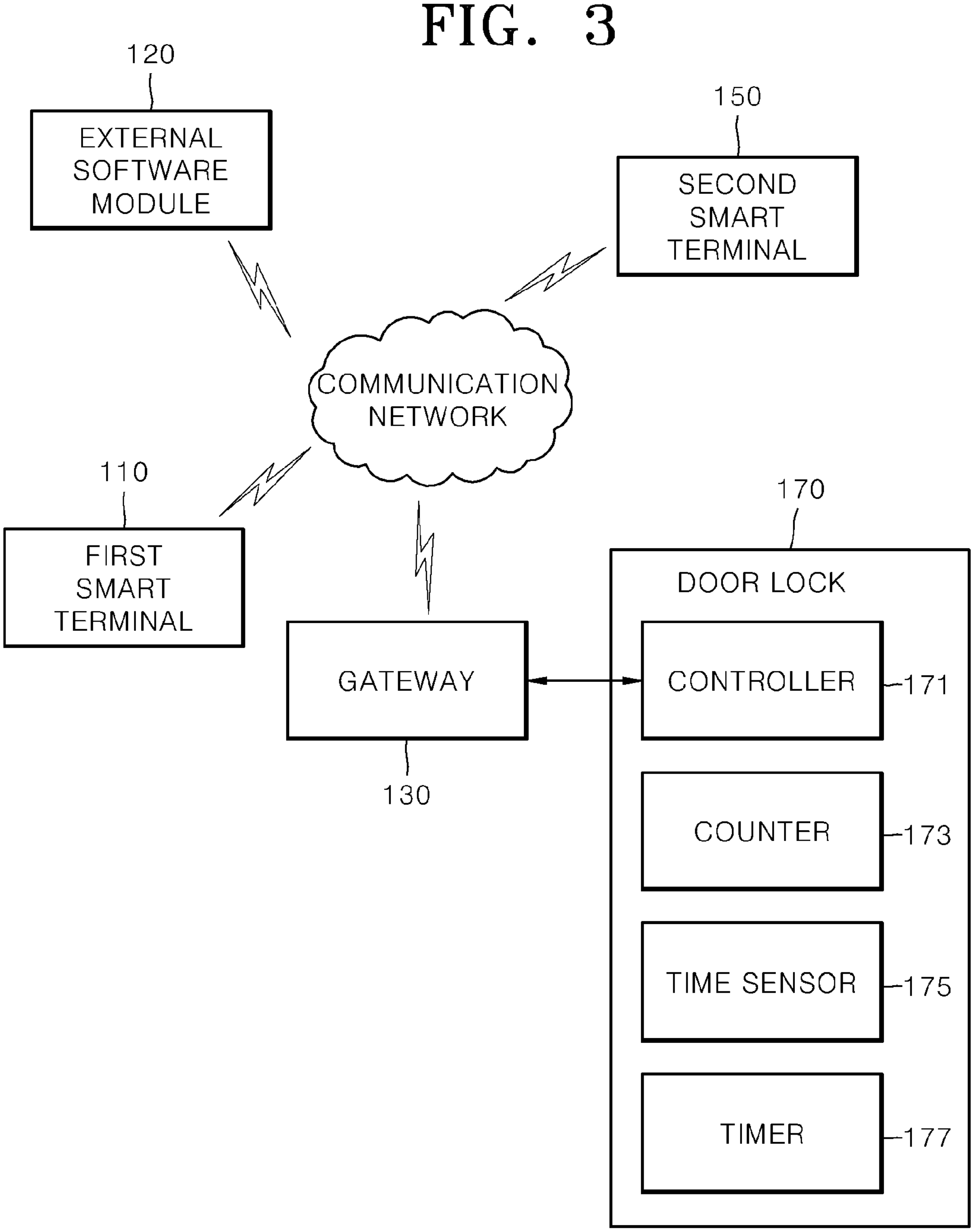
FIG. 3 is a block diagram illustrating a configuration for controlling a door lock of a home network system according to another embodiment of the present invention.

Referring to FIG. 3, in another embodiment of the present invention, when the user transmits an external request (i.e., instructions to generate release information of the door lock 170) to a server (not shown) communicating with the home network system or the gateway 130 by using the first smart terminal 110, the release information of the door lock 170 may also be generated by an external software module 120 in the server or the gateway 130. Location of the external software module 120 is not limited to any particular location, and type of the external software module 120 is not limited to any particular type of software. As described above, because the release information of the door lock 170 can be generated by the external software module 120, the first smart terminal 110 plays only a role for transmitting the instructions to generate release information of the door lock 170.

In Operation S110, the user may transmit both the release information and the usage setting conditions to the gateway 130, and only the release information may also be transmitted to the temporary user. As will be described later, because the gateway 130 has to transmit the release information and information about the usage setting conditions, which are received from the user, to the door lock 170, the user transmits both the release information and the usage setting conditions to the gateway 130. However, because the temporary user can use the release information regardless of being aware of the usage setting conditions, the usage setting conditions may not be transmitted to the temporary user. In the current embodiment, it is more desirable that both the release information and the usage setting conditions are transmitted to the temporary user for better convenience.

The user's transmission of the release information and the usage setting conditions to the temporary user's second smart terminal 150 is performed via the wireless communications network, as described above. For example, the release information and the usage setting conditions may be transmitted, for example, in the form of a text message or the form of an electronic key for the NFC through an SMS, an MMS, an e-mail, a chatting application (for example, WhatsApp), etc., using the temporary user's second smart terminal 150, i.e., the temporary user's smartphone.

The user transmits the release information generated by the user from the first smart terminal 110 to the gateway 130 and the second smart terminal 150. In case that the external software module 120 generates the release information of the door lock 170, the external software module 120 can directly transmit the release information of the door lock 170 to the second smart terminal 150. In this case, because the user does not need to receive the release information, the release information may be transmitted only to the temporary user.

The gateway 130 transmits the release information and the usage setting conditions transmitted from the user, to the controller 171 of the door lock 170 (S115). The gateway 130 transmits the release information and the usage setting conditions, such that the door lock 170 can use the release information.

When the release information and the usage setting conditions are stored in the door lock 170 and the temporary user inputs the release information transmitted from the user, the controller 171 of the door lock 170 determines whether the release information input by the temporary user is identical to the release information stored in the door lock 170 and unlocks/locks the door lock 170 based on the determination (S120). More specifically, when the release information input by the temporary user is identical to the release information stored in the door lock 170, the controller 171 releases the locking state of the locking module (not shown) provided in the door lock 170 to open the corresponding door.

In an operation of locking/unlocking the door lock 170, when the temporary user inputs the release information, the controller 171 determines whether the release information complies with the usage setting conditions. First, as described above, when the usage setting conditions are the valid number of times the release information can be validly used, the counter 173 provided in the door lock 170 counts the number of times the release information has been used. When the number of times the release information has been used exceeds the valid number of times, the controller 171 transmits expiration of the usage setting conditions to the gateway 130.

When the usage setting conditions are the starting time at which the release information begins valid and the ending time at which the release information expires, the time sensor 173 provided in the door lock 170 checks a current time when the release information are input, and transmits the current time to the controller 171. If the time at which the release information are input, is before the starting time, the door lock 170 is not unlocked. However, if the time at which the release information are input, is on or after the starting time, the door lock 170 is unlocked. If the time at which the release information are input, is after the ending time, the controller 171 transmits expiration of the usage setting conditions to the gateway 130.

When the usage setting conditions are the valid period of time for which the release information is valid, and the release information is input for the first time, the timer 175 provided in the door lock 170 starts operating. The timer 175 is set as the valid period of time that is the usage setting conditions, by the controller 171 such that, while the timer 175 operates, the release information may be validly used and the door lock 170 can be unlocked based on the release information. If the time at which the release information are input, exceeds the valid period of time, i.e., the operation of the timer 175 ends, the controller 171 transmits expiration of the usage setting conditions to the gateway 130. The timer 175 can be restored to its initial state.

In the operation of locking/unlocking the door lock 170, when expiration of the usage setting conditions is received from the controller 171, the gateway 130 deletes the release information and transmits the result of deletion of the release information to the controller 171. Thus, after the usage setting conditions expire, even when the temporary user inputs the release information to the door lock 170, the locking state of the door lock 170 is not released. Thus, when the usage setting conditions of the release information expire, the temporary user has to request to generate new release information to the user.

As described above, if the release information of the door lock 170 can be generated, the user does not need to notify the user's privately preferred password numbers to the temporary user who visits the house for a limited time. That is, there is no need to change the password due to the disclosure of the user's privately preferred password numbers, such that the user's convenience and security of the door lock can be enhanced. Also, if the usage setting conditions for validly using the release information expire within a short period of time, security for the release information can also be improved. If the usage setting conditions expire, the release information is automatically discarded, so that damage caused by the revealment of the release information can be prevented.

In the operation of locking/unlocking the door lock 170, when the temporary user unlocks the door lock 170 by inputting the release information transmitted to the second smart terminal 150, the controller 171 of the door lock 170 informs the gateway 130 of unlocking of the door lock 170 by the input release information. The gateway 130 transmits an authentication key to the second smart terminal 150. The authentication key is used to connect the second smart terminal 150 to the gateway 130. By using the authentication key transmitted to the second smart terminal 150, the second smart terminal 150 is connected to the gateway 130. Thus, the temporary user may remotely control the home network devices (not shown) connected to the gateway 130 using the second smart terminal 150.

In the above-described embodiment, the controller 171 of the door lock 170 determines whether the release information input by the temporary user is identical to the release information transmitted from the gateway 130.

As a variation of the above-described embodiment, the gateway 130 instead of the door lock 170 may receive the release information input by the temporary user from the door lock 170, compare the input release information with release information (or self-stored release information without an additional transmission operation) transmitted from the first smart terminal 110 or the external software module, and determine whether the door lock 170 is unlocked or locked. If the gateway 130 determines the door lock 170 to be unlocked, the gateway 130 transmits instructions to the door lock 170 for performing the unlocking of the door lock 170. In this case, transmission of the release information from the gateway 130 to the door lock 170 is selectively performed because the determination of unlocking or locking of the door lock 170 may be made by the gateway 130.

As another variation of the above-described embodiment, a server (not shown) communicating with the gateway 130 may receive the release information input by the temporary user from the door lock 170, compare the input release information with the stored release information transmitted from the first smart terminal 110 or the external software module, and determine whether the door lock 170 should be unlocked or locked. If the server determines for the door lock 170 to be unlocked, the server transmits instructions to the door lock 170 for performing the unlocking of the door lock 170.

As an additional variation of the above-described embodiment, a sub-system combining the gateway 130 and a server (now shown) that is configured to communicate with the gateway 130 may receive the release information transmitted from the first smart terminal 110 or the external software module, transmit the received release information to a second smart terminal of a temporary user, determine whether the release information input on the door lock 170 by the temporary user is compared with the received release information, and based on determination, transmits instruction for controlling the door lock 170 to the controller 171 of the door lock 170.

Figure 7:
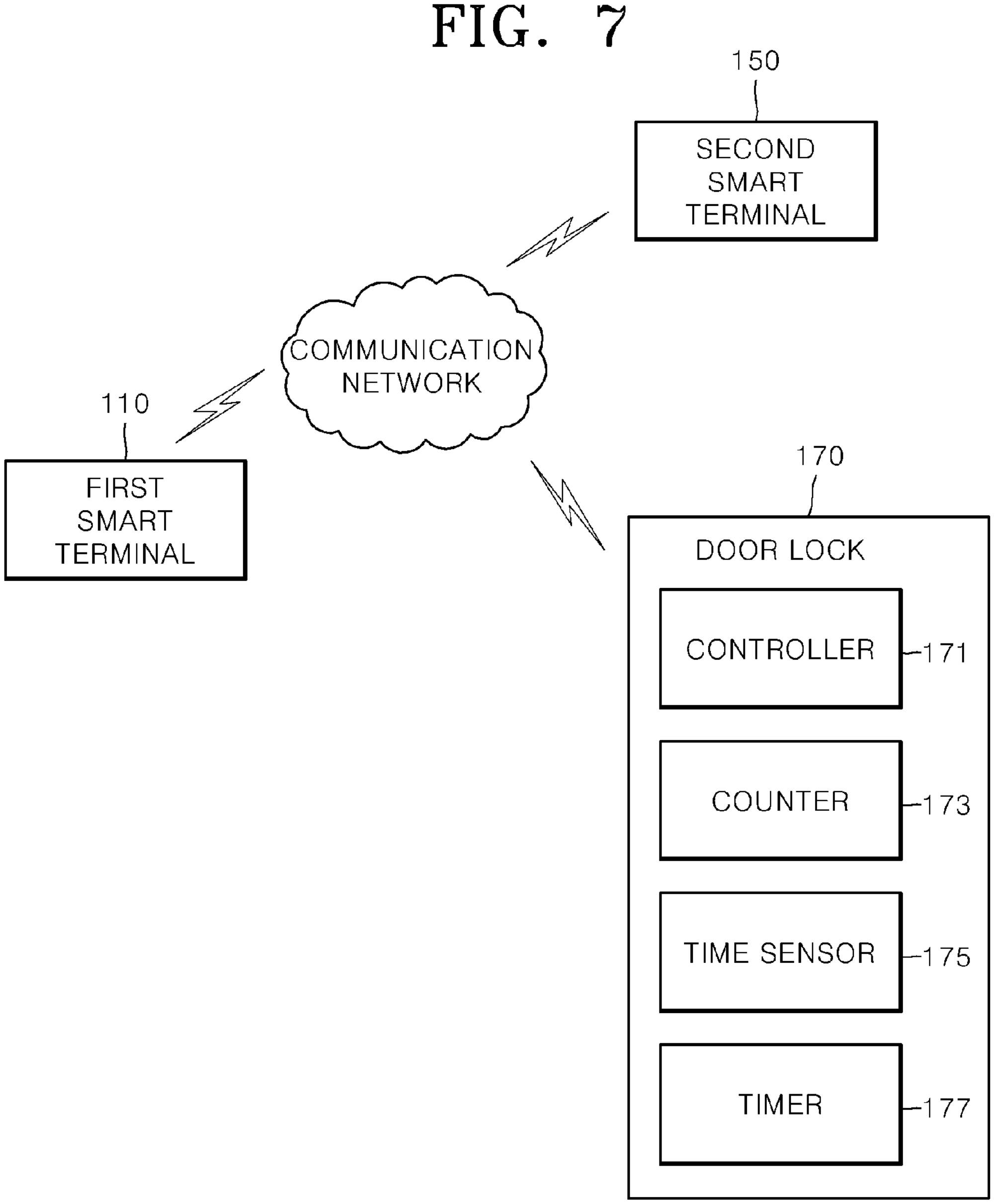
FIG. 7 is a block diagram illustrating a configuration for implementing a method for controlling a door lock of a home network system according to another embodiment of the present invention.

FIG. 7 illustrates a configuration for implementing a method for controlling a door lock of a home network system according to another embodiment of the present invention. Referring to FIG. 7, in order to control the door lock of the home network system according to another embodiment of the present invention, the configuration includes a first smart terminal 110, a second smart terminal 150, and a door lock 170', as in the above-described embodiment. Although a gateway is not shown, a user controls the door lock 170' connected to the gateway (not shown) by using the first smart terminal 110.

However, in the current embodiment, the door lock 170' by itself can make communications with the first smart terminal 110 via a wireless communication network or a near-field communication network. Thus, in the current embodiment, when the user generates release information used to unlock/lock the door lock 170' by using the first smart terminal 110, the first smart terminal 110 by itself may transmit the release information to the door lock 170' via the wireless communications network.

The above-described embodiment and the current embodiment are only different from each other in that the door lock 170' by itself may make communications with the first smart terminal 110 via the wireless communications network. That is, subsequent control operations (an operation of locking/unlocking the door lock 170') are the same as those of the above-described embodiment. Thus, detailed descriptions thereof will be omitted.

As described above, a method for controlling a door lock of a home network system has the following effects.

First, because release information that is used for a limited time can be generated, the release information can be provided to a temporary user who needs to use the door lock for the limited time without the need of revealing the user's privately preferred password numbers, so that damage caused by the revealment of the user's password can be prevented.

Second, usage setting conditions for using the release information are generated together with the release information. When the usage setting conditions expire, the release information is automatically discarded, so that damage caused by the revealment of the release information can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for controlling a door lock of a home network system in which the door lock for locking or unlocking a door is connected to a gateway and is connected to a communications network, the method comprising:

generating a first release information configured to be used to lock or unlock the door lock in an external software module which communicates with a first smart terminal according to a request from the first smart terminal, or in a software installed in the first smart terminal;

transmitting the generated first release information from the external software module or the first smart terminal to the gateway and a second smart terminal;

transmitting the received first release information from the gateway to a controller of the door lock; and locking or unlocking the door lock by determining whether a second release information input into the door lock from an outside of the door lock is identical to the first release information transmitted from the gateway, wherein the generating of the first release information comprises generating usage setting conditions for using the first release information, wherein the usage setting conditions define a valid period of time for which the first release information is valid based on the time at which the second release information is input for the first time, and the locking or unlocking of the door lock comprises, when the second release information is input from the outside of the door lock, determining whether the input second release information complies with the usage setting conditions, and if time at which the second release information is input exceeds the valid period of time, notifying expiration of the usage setting conditions to the gateway.

2. The method of claim 1, wherein the usage setting conditions comprise the valid number of times the first release information are usable, and the locking or unlocking of the door lock comprises, when the second release information is input from the outside of the door lock, determining whether the input second release information complies with the usage setting conditions, and if the number of times the first release information having been used exceeds the valid number of times, notifying expiration of the usage setting conditions to the gateway.

3. The method of claim 1, wherein the usage setting conditions comprise a starting time at which the first release information begins valid, and an ending time at which the first release information expires, and the locking or unlocking of the door lock comprises, when the second release information is input from the outside of the door lock, determining whether the input second release information complies with the usage setting conditions, and if time at which the second release information is input exceeds the ending time, notifying expiration of the usage setting conditions to the gateway.

4. The method of claim 1, wherein the transmitting of the first release information comprises transmitting the first release information and the usage setting conditions in a form of a text message to the second smart terminal.

5. A method for controlling a door lock of a home network system in which the door lock for locking or unlocking a door is connected to a gateway and is connected to a communications network, the method comprising:

generating a first release information configured to be used to lock or unlock the door lock in an external software module which communicates with a first smart terminal according to a request from the first smart terminal, or in a software installed in the first smart terminal;

transmitting the generated first release information from the external software module or the first smart terminal to the gateway and a second smart terminal;

transmitting the received first release information from the gateway to a controller of the door lock; and locking or unlocking the door lock by determining whether a second release information input into the door lock from an outside of the door lock is identical to the first release information transmitted from the gateway, wherein the generating of the first release information comprises generating usage setting conditions for using the first release information, wherein, if, in the locking or unlocking of the door lock, it is determined that the usage setting conditions have expired, the gateway deletes the first release information and then transmits the result of deletion of the first release information to the controller.

6. A method for controlling a door lock of a home network system in which the door lock for locking or unlocking a door is connected to a gateway and is connected to a communications network, the method comprising:

generating a first release information configured to be used to lock or unlock the door lock in an external software module which communicates with a first smart terminal according to a request from the first smart terminal, or in a software installed in the first smart terminal;

transmitting the generated first release information from the external software module or the first smart terminal to the gateway and a second smart terminal;

transmitting the received first release information from the gateway to a controller of the door lock; and locking or unlocking the door lock by determining whether a second release information input into the door lock from an outside of the door lock is identical to the first release information transmitted from the gateway, wherein the locking or unlocking of the door lock comprises, if the door lock is unlocked based on the second release information input from the outside of the door lock, transmitting an authentication key that is connectable to the gateway, to the second smart terminal.

7. The method of claim 6, further comprising, after the locking or unlocking of the door lock, remotely controlling a home network device connected to the gateway by using the second smart terminal after the second smart terminal is connected to the gateway by using the authentication key transmitted to the second smart terminal.

8. A system including a gateway of a home network system and a server which is connected to and interacts with the gateway, where the gateway is connected to a door lock and the door lock is connected to a communication network via the gateway, the system comprising one or more software and/or hardware modules configured to:

receive by the gateway a first release information configured to be used to lock or unlock the door lock from a first smart terminal or an external software module which communicates with the first smart terminal, wherein the first release information is generated in the external software module according to a request from the first smart terminal or in a software installed in the first smart terminal;

transmit the received first release information from the gateway or the server to a second smart terminal, wherein a second release information input from an outside of the door lock is compared with the received first release information, and based on a result of the comparison, locking or unlocking the door lock is determined, wherein the received first release information comprises usage setting conditions for using the first release information, wherein the usage setting conditions define a valid period of time for which the first release information is valid based on the time at which the second release information is input for the first time, and wherein the one or more software and/or hardware modules are further configured to:

when the second release information is input from the outside of the door lock, determine whether the input second release information complies with the usage setting conditions, and if time at which the second release information is input exceeds the valid period of time, transmit expiration of the usage setting conditions to the door lock or the gateway.

9. The system of claim 8, wherein the usage setting conditions comprise the valid number of times the first release information are usable, and wherein the one or more software and/or hardware modules are further configured to:

when the second release information is input from the outside of the door lock, determine whether the input second release information complies with the usage setting conditions, and if the number of times the first release information having been used exceeds the valid number of times, transmit expiration of the usage setting conditions to the door lock or the gateway.

10. The system of claim 8, wherein the usage setting conditions comprise a starting time at which the first release information begins valid, and an ending time at which the first release information expires, and wherein the one or more software and/or hardware modules are further configured to:

when the second release information is input from the outside of the door lock, determine whether the input second release information complies with the usage setting conditions, and if time at which the second release information is input exceeds the ending time, transmit expiration of the usage setting conditions to the door lock or the gateway.

11. The system of claim 8, wherein the one or more software and/or hardware modules are further configured to transmit the first release information and the usage setting conditions in a form of a text message to the second smart terminal.

12. The system of claim 8, wherein the one or more software and/or hardware modules are further configured to, when the door lock is unlocked based on the second release information input from the outside of the door lock, transmit an authentication key that is required for accessing the gateway, to the second smart terminal.

13. The system of claim 12, wherein the one or more software and/or hardware modules are further configured to, after the locking or unlocking of the door lock, remotely control a home network device connected to the gateway by using the second smart terminal after the second smart terminal is connected to the gateway by using the authentication key transmitted to the second smart terminal.

14. A system including a gateway of a home network system and a server which is connected to and interacts with the gateway, where the gateway is connected to a door lock and the door lock is connected to a communication network via the gateway, the system comprising one or more software and/or hardware modules configured to:

receive by the gateway a first release information configured to be used to lock or unlock the door lock from a first smart terminal or an external software module which communicates with the first smart terminal, wherein the first release information is generated in the external software module according to a request from the first smart terminal or in a software installed in the first smart terminal;

transmit the received first release information from the gateway or the server to a second smart terminal, wherein a second release information input from an outside of the door lock is compared with the received first release information, and based on a result of the comparison, locking or unlocking the door lock is determined, wherein the received first release information comprises usage setting conditions for using the first release information, wherein the one or more software and/or hardware modules are further configured to, if it is determined that the usage setting conditions have expired, delete the first release information and then transmit a result of deletion of the first release information to the door lock or the gateway.

* * * * *